(12) United States Patent
Miller

(10) Patent No.: US 6,199,168 B1
(45) Date of Patent: Mar. 6, 2001

(54) PERSONAL COMPUTER CARD POWER MANAGEMENT SYSTEM

(75) Inventor: Bruce Miller, Coquitlam (CA)

(73) Assignee: Sierra Wireless, Inc., Richmond (CA)

( * ) Notice: Subject to any disclaimer, the term of this patent is extended or adjusted under 35 U.S.C. 154(b) by 0 days.

(21) Appl. No.: 09/160,501

(22) Filed: Sep. 24, 1998

(51) Int. Cl.[7] .................. G06F 1/26; G06F 1/28; G06F 1/30

(52) U.S. Cl. ............ 713/300; 713/310; 713/320; 713/330; 710/2; 710/8; 710/101; 710/102; 710/103; 320/106; 320/125; 320/165; 702/63

(58) Field of Search ..................... 713/300, 310, 713/320, 330, 323, 2, 324; 710/1, 101, 102, 8, 72, 2; 375/347; 361/686, 796, 680, 798, 801; 439/61, 325; 455/127, 504, 575; 320/165, 125, 106; 702/63

(56) References Cited

U.S. PATENT DOCUMENTS

| | | |
|---|---|---|
| 4,922,178 | 5/1990 | Matuszewski et al. . |
| 5,218,284 | 6/1993 | Burns et al. . |
| 5,300,874 * | 4/1994 | Shimamoto et al. ................. 320/106 |
| 5,401,592 * | 3/1995 | Gilpin et al. ............................ 429/97 |
| 5,485,073 * | 1/1996 | Kasashima et al. .................. 320/106 |
| 5,514,946 * | 5/1996 | Lin et al. ................................ 702/63 |
| 5,550,861 | 8/1996 | Chan et al. . |
| 5,589,719 * | 12/1996 | Friset .................................... 307/131 |
| 5,656,876 | 8/1997 | Radley et al. . |
| 5,693,431 | 12/1997 | Nierescher et al. . |
| 5,706,239 | 1/1998 | Brys . |
| 5,848,298 * | 12/1998 | Steere, Jr. et al. ..................... 710/62 |

* cited by examiner

Primary Examiner—Ayaz R. Sheikh
Assistant Examiner—Frantz Blanchard Jean
(74) Attorney, Agent, or Firm—Burns, Doane, Swecker & Mathis, LLP

(57) ABSTRACT

A power management system for a PC card is disclosed. The power management system allows for a detachable battery pack to be used on a PC card. The PC card can select power from the personal computer or from the detachable battery pack. In one embodiment, power can also be selected from a DC wall adaptor, which can be connected to the PC card or battery pack. In another embodiment, the power controller on the PC card is always powered by the personal computer, so that the power management system can work even when a detachable battery pack is low in power or not connected to the PC card. The battery pack can be recharged from the DC wall adaptor or from the personal computer.

23 Claims, 3 Drawing Sheets

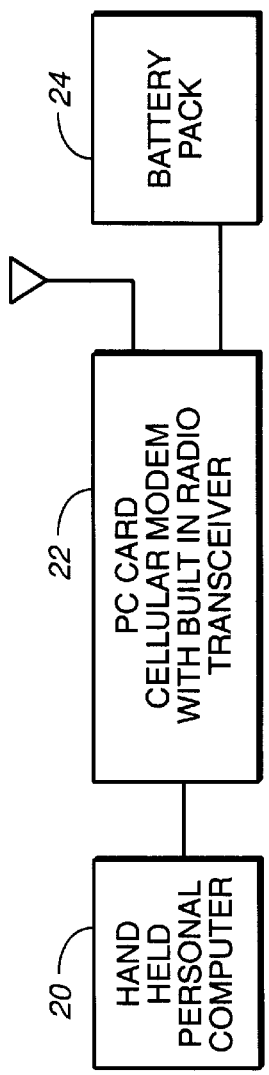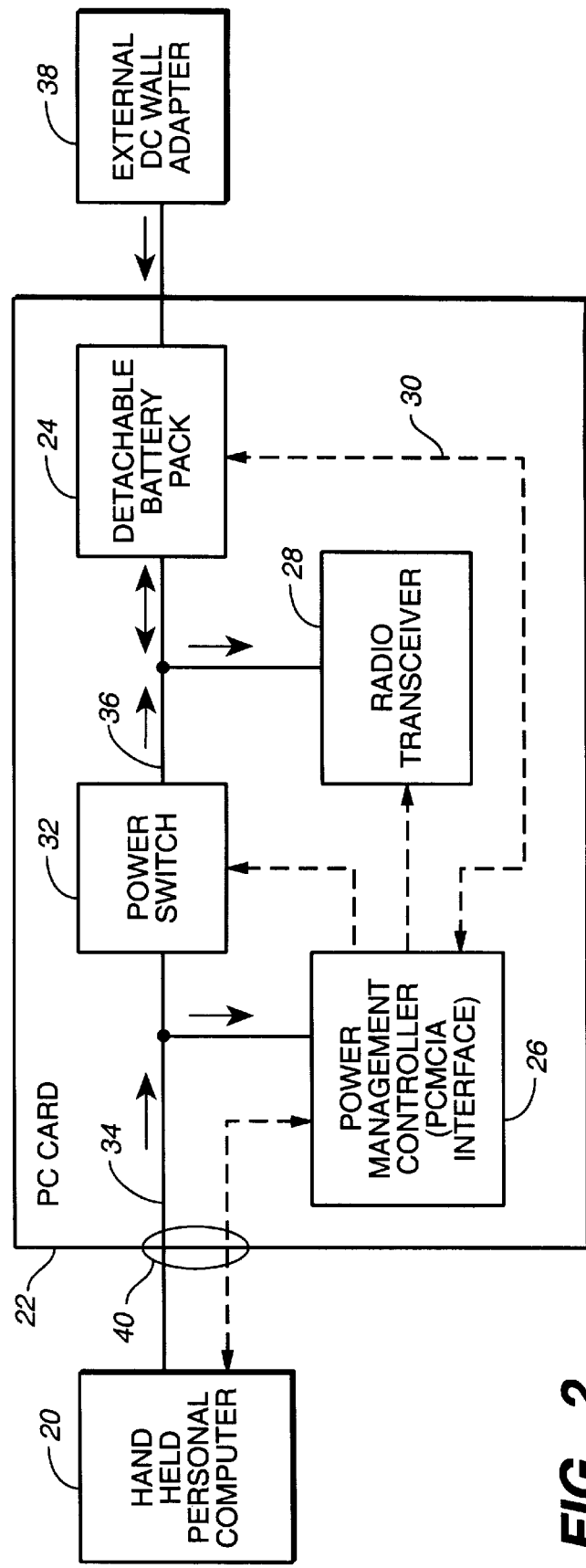

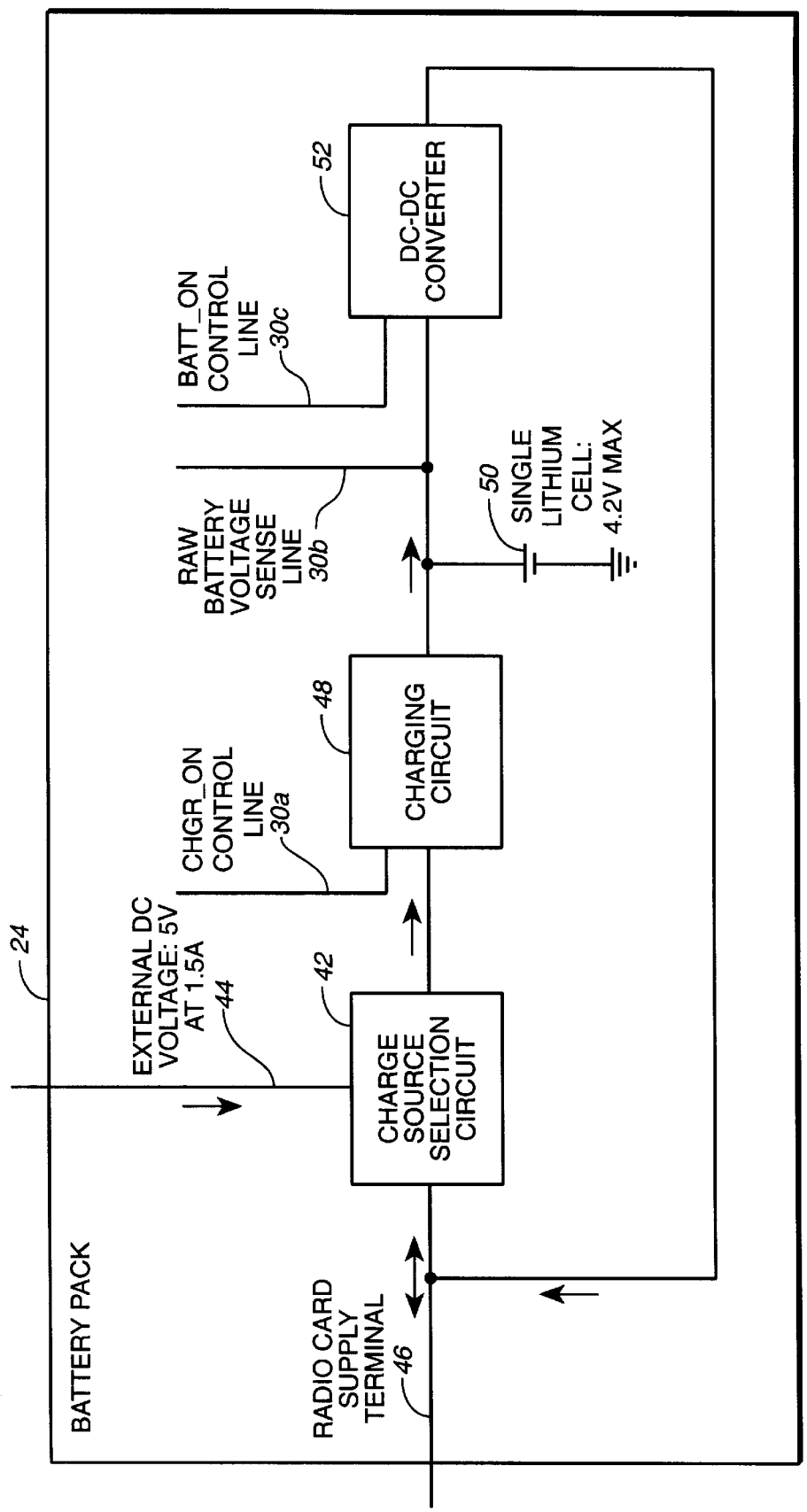
FIG._3

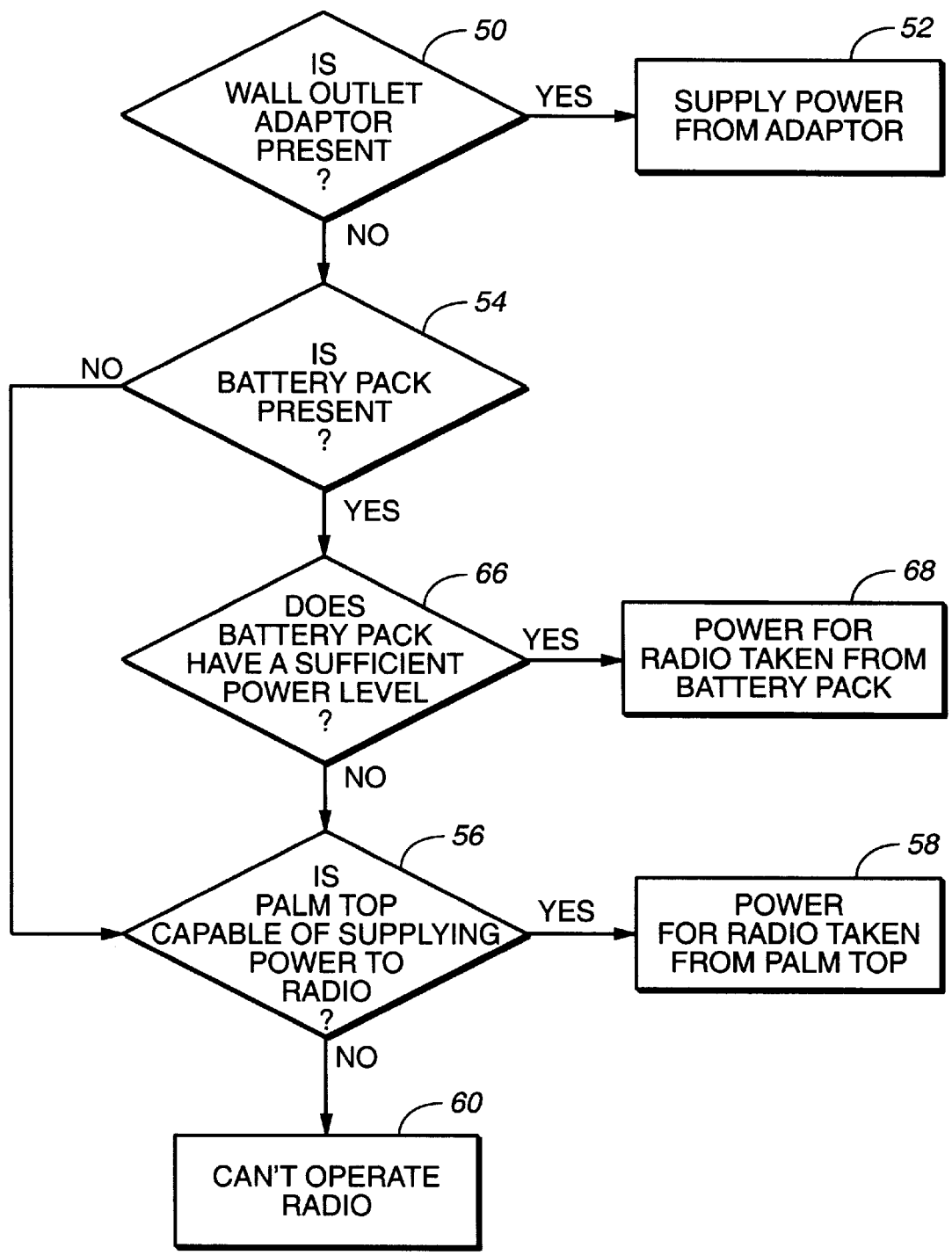
FIG._4

PERSONAL COMPUTER CARD POWER MANAGEMENT SYSTEM

BACKGROUND OF THE INVENTION

1. Field of the Invention

The present invention relates to personal computer (PC) cards, particularly to the power management of PC cards.

2. State of the Art

PC cards are a common way to add peripheral devices to a personal computer. Elements such as memory or communication devices, can be placed on a PC card having a standard interface with personal computers. A common interface standard for PC cards is the Personal Computer Memory Card Interface Association (PCMCIA) standard. The PC cards are typically powered by the personal computer to which they are attached. This causes no problems when the PC cards are used with desktop computers connected to a wall power outlet. This can cause problems, however, when the PC cards are used with portable computers, especially handheld personal computers. For example, some handheld personal computers are powered by two AA batteries, and thus there is little spare current for power-using elements on the PC card. This can effectively limit the types of PC cards used with handheld computers.

It is desired to have an improved method and apparatus for managing the power supplied to the PC card.

SUMMARY OF THE PRESENT INVENTION

The present invention, generally speaking, relates to providing a detachable battery pack on a PC card. Thus, the handheld personal computer is not required to supply power to the power-hungry elements on the PC card and these elements, such as radio transceivers, can be added to the PC cards used with handheld personal computers.

In an embodiment of the present invention, a PC card with a battery pack can be selectively powered either by the personal computer or by the battery pack. This provides for flexibility in the power management. If a handheld personal computer has a lot of power, such as when the personal computer is connected to an external DC power source, the handheld personal computer can supply power to the PC card. The battery pack can even be removed from the PC card. Otherwise, the power for the PC card can be supplied by the battery pack. In one embodiment, the detachable battery pack is rechargeable from the personal computer when the personal computer is connected to a DC wall adapter.

In another embodiment of the present invention, the PC card has a power controller which is always powered by the personal computer. Thus, the PC card can turn-on even if the battery pack is missing or is low in power. In a preferred embodiment, the power controller is a personal computer interface circuit controlled by software running on the personal computer.

The PC card is preferably such that power from a DC adaptor can be supplied to the PC card or battery pack directly so that the PC card can be powered by the DC power supply. This allows the battery pack to save its charge when a wall outlet is nearby.

BRIEF DESCRIPTION OF THE DRAWINGS

The present invention may be further understood from the following description in conjunction with the appended drawings. In the drawings:

FIG. 1 is a diagram illustrating the connection of the handheld personal computer, PC card, and the battery pack.

FIG. 2 is block diagram illustrating the connection of the handheld personal computer and the PC card.

FIG. 3 is a block diagram of the detachable battery pack.

FIG. 4 is flow chart illustrating the power control for the PC card.

DETAILED DESCRIPTION OF THE PREFERRED EMBODIMENT

FIG. 1 is a diagram showing the handheld personal computer 20, PC card 22 and detachable battery pack 24. The handheld personal computer can be of the type that uses two AA batteries. The handheld personal computer 20 can also have an operating system that allows for PC card software to be run on the hand held personal computer. For example, a number of hand held personal computers are currently being produced that run the Windows CE201 operating system, including Casio, HP and Sharp handheld personal computers.

The PC card 22 may require a greater amount of power than can be provided by the handheld computer. For example, the PC card can be a cellular modem with a built-in radio transceiver. Cellular modems can require 600 milli-amps of current at 5 volts when the radio transceiver is fully operational. In a preferred embodiment, the radio transceiver transfers Cellular Digital Packet Data, (CDPD). This allows a handheld personal computer to send e-mail, connect to the Internet, and do a wide range of information retrieval services. The PC card can be a type II card under the PCMCIA standard.

The detachable battery pack 24 can be attached to the PC card 22 so as to provide 30 to 60 minutes of continuous transmission of the cellular modem. The battery pack is not required for the operation of the PC card when the handheld personal computer 20 has enough power to energize the PC card. This can happen, for example, when the handheld personal computer is connected to a wall outlet adaptor or when the handheld computer has a very large battery.

FIG. 2 is a block diagram illustrating the power management of the PC card 22. The power management controller 26 is used to control the powering of elements on the PC card. In a preferred embodiment, the power management controller 26 is a PCMCIA interface that sends signals to and from the handheld personal computer 20. The handheld personal computer 20 runs software which determines how a power using element of the PC card, such as a radio transceiver 28, is powered.

In a preferred embodiment, the power management controller 26 is connected to the detachable battery pack 24 by the control lines 30. In one embodiment, four control lines are used: a line to determine the presence of the external DC adapter 38; a line to switch the detachable battery pack output on or off; a line to determine the battery voltage; and a line to control the recharging of the battery.

Looking again at FIG. 2, power switch 32 is preferably a low loss transistor switch. This switch 32 can direct power from the handheld personal computer on line 34, to line 36, making it available to the radio transceiver and detachable battery pack. In a preferred embodiment, the power switch 32 will be switched on when the handheld personal computer is connected to a DC wall adaptor.

The power management controller 26 also sends signals to the radio transceiver 28 so that the radio transceiver can fall asleep during the deadtime that is common for cellular modem radio transceivers. As discussed below, the detachable battery pack 24 can be recharged while the radio transceiver is not operating.

An external DC wall adaptor 38 can be connected to the detachable battery pack 24 to provide power to the radio transceiver 28. As described below, this external source of DC power can also be used to recharge the battery pack 24.

In a preferred embodiment, the power management controller 26 is directly connected to the power line 34. This allows the power management controller 26 to be powered by the handheld personal computer 20 even when there is not enough power in the system to fully power the radio transceiver 28. Thus, if the detachable battery pack 24 is not connected to the PC card or is very low on power, the PC card 22 can still turn on and check the PC card's status. The current draw for the power management controller 26 is preferably relatively small, around 2 to 20 milliamps.

The handheld personal computer 20 is preferably connected to the PC card 22 by a socket connector. The socket connector for the PC card 22 is, in a preferred embodiment, the socket connector described by the PCMCIA standard for a type II PC card.

FIG. 3 is a block diagram of the battery pack 24. The battery pack 24 is described in detail in the patent application "Smart Personal Computer Card Battery Pack", inventor Bruce Miller, which is incorporated herein by reference. In a preferred embodiment, the battery pack 24 has a charge source selection circuit 42. The charge source selection circuit 42 selects the source of power used to recharge the battery pack 24. The power can be from the external DC voltage from line 44 or power from the personal computer by way of the PC card 22 on line 46. The charge choice selection circuitry 42 preferably selects the external DC voltage on line 44 when it is connected. The charge selecting circuit 42 can also detect the presence of the DC wall adapter. If the DC wall adapter is connected, charge is sent to the power-using element on the PC card as well as to the charging circuit 48.

The charging circuit 48 is connected to the charge selection circuit 42. The charging circuit 48 supplies charge to the battery cell, preferably following a charging curve which decreases the current supply as the battery cell becomes full.

The battery cell 50 is preferably a lithium-ion battery cell. The lithium battery cell provides a 4.2 volts maximum, 3.7 volts nominal unregulated voltage. This voltage is send to the DC-DC converter 52. The DC-DC converter 52 produces a regulated 5 volt output which can be supplied along line 46 to line 36 of the PC card 22 and ultimately to the power-using element of the PC card 22, such as the radio transceiver 28.

Looking again at FIG. 3, the battery pack preferably has control lines 30 connected to the PC card. Control line 30a controls the charging of the lithium battery cell. Control line 30b provides a raw battery voltage sense line to indicate the voltage of the lithium battery cell 50. Control line 30c is the battery-on control line. When control line 30c is on, battery power is supplied along line 46. When the control line 30c is off, the battery pack 24 does not supply power along line 46.

In a preferred embodiment, the battery pack 24 can be recharged in a number of ways.

1) When the battery pack is connected to PC card socket, but not in active use, the battery can draw a small amount of power from the handheld personal computer (typically 200 mA at 5 volts.) This will recharge the lithium cell in 5–6 hours. However, this method is only feasible if the handheld personal computer is powered from an external wall adaptor. Otherwise, the handheld personal computer's battery would become depleted trying to recharge the lithium cell.

2) The battery pack can be removed from the PC card and plugged into its' own wall adaptor. Because the circuitry to recharge the battery is present within the pack, this will fast charge the cell in about 2 hours. The user can carry two battery packs around with the handheld personal computer: one battery pack can be recharging while the other is in active use. This fast recharge also works if the battery pack is plugged into the PC card, but the PC card is not connected to the handheld personal computer.

3) The external wall adaptor can be plugged into the battery pack while the pack is plugged into the PC card and the PC card is present in the handheld personal computer socket. In this mode of operation, the wall adaptor acts as a battery eliminator and can power the card indefinitely. The battery will be recharged at either 200 mA or 600 mA, depending of the power rating of the DC adaptor and the modem card's current operating state, while the external wall adaptor continues to power the PC card.

FIG. 4 is a flow chart illustrating the power management system of the present invention. In the preferred embodiment, the power management system runs in the software of the handheld personal computer 20. Control lines from the power management controller PCMCIA interface 26 is sent to the personal computer and interpreted by the software running in the personal computer to control the power system.

A preferred embodiment of the present invention operates as follows. In step 50, it is checked whether a wall outlet adaptor is present. If the wall outlet adaptor is connected to the PC card 22, in step 52, the power for the power card is provided from the adaptor. If there is no DC adaptor present, in step 54 it is checked whether a battery pack is present in the PC card 22. The presence or absence of the battery pack can be indicated to the power management controller 26 and thus to the software running in the handheld personal computer 20 by one of the control lines 30.

If the battery pack is not present, in step 56, it is checked whether the handheld personal computer is capable of supplying power to the PC card. This can be done if the handheld personal computer has a large enough battery or if the handheld personal computer is itself connected to the wall outlet adaptor. If the handheld personal computer is capable of powering to the radio, power for the radio is taken from the handheld personal computer in step 58. If the handheld personal computer is not capable of supplying the power, the radio cannot be operated, as stated in step 60.

Looking again at step 54, if the battery pack is present in the PC card 22, it is checked, in step 66, whether the battery pack has a sufficient power level. This is done using the battery voltage control line 30b shown in FIG. 3.

Looking again at FIG. 4, if the battery does have sufficient power, then the power for the radio is taken from the battery pack, in step 68. If not, then, in step 56 it is checked if the palmtop is capable of supplying power.

It will be appreciated by those of ordinary skill in the art that the invention can be embodied in other specific forms without departing from the spirit or essential character thereof. For example, although the preferred embodiment describes that the power-using element on the PC card 22 as a radio transceiver, this power-using element can be any other type of power-using device. Additionally, as shown in FIG. 2, in the preferred embodiment, the power management controller 26 comprises an interface to the handheld personal computer. The power management controller 26 could, however, be a dedicated processor that runs on the PC card 22. Additionally, although a detachable battery pack is used in the preferred embodiment, for some of the embodiments of the present invention a battery pack integrally formed with the PC card could be used.

The present disclosed embodiments are therefore considered, in all respects, to be illustrative and not restrictive. The scope of the invention is indicated by the appended claims, rather than the foregoing descriptions and all changes which come within that medium range of equivalent thereof, are intended to be embraced therein.

What is claimed is:

1. A personal computer card operably connectable to a detachable battery pack, the personal computer card including a personal computer card socket allowing the connection of the personal computer card to a personal computer, the socket including a personal computer card socket power line, the personal computer card also including a power-using element operably connectable to the detachable battery pack and the personal computer; the personal computer card including a power controller adapted to select whether power is sent to the power-using element on the personal computer card from the personal computer card socket power line or from the detachable battery pack, the power controller adapted to detect the presence or absence of the detachable battery pack as well as to detect the power available across the personal computer socket from the personal computer.

2. The personal computer card of claim 1, wherein the power controller includes an interface with the personal computer, wherein the interface is controlled by software running on the personal computer.

3. The personal computer card of claim 1, wherein the power controller is powered by the personal computer card socket line.

4. The power management system of claim 1, wherein the personal computer card is such that it can connect to an external DC wall adapter to power the power-using element.

5. The power management system of claim 1, wherein the external DC wall adapter connects to the battery pack.

6. The power management system of claim 1, further comprising an external DC wall adapter connects to a personal computer connected to the personal computer card at the personal computer card socket.

7. The power management system of claim 1, wherein the power controller is powered by the personal computer card power socket line.

8. The power management system of claim 1, wherein the personal computer card is a personal computer card modem and the power-using element is a radio transceiver.

9. The power management system of claim 1, wherein the battery pack can be recharged from the personal computer card socket line.

10. The power management system of claim 1, wherein the personal computer card socket is a PCMCIA connection.

11. The system of claim 1, further comprising a personal computer connected at the personal computer card socket.

12. A personal computer card operably connectable to a detachable battery pack, the personal computer card including a personal computer card socket allowing the connection of the personal computer card to a personal computer, the socket including a personal computer card socket power line, the personal computer card also including a power-using element operably connectable to the detachable battery pack and personal computer card socket; the personal computer card including a power controller adapted to select whether power is sent to the power-using element on the personal computer card from the personal computer card socket power line or from the detachable battery pack, the power controller adapted to detect the presence or absence of the detachable battery pack as well as to detect the power available across the personal computer socket from the personal computer, wherein the power controller is adapted to allow the battery pack to be recharged from the personal computer card socket power line.

13. The personal computer card of claim 12, wherein the power controller is an interface with a hand-held computer, wherein the interface is controlled by software running on the hand-held computer.

14. The personal computer card of claim 12, wherein the battery pack is recharged over the personal computer card socket power line when the power-using element on the personal computer card is not operating at full power.

15. The personal computer card of claim 12, wherein the system further comprises an external DC wall adapter that can be connected to the system to power the power-using element.

16. The personal computer card of claim 12, wherein the personal computer card is a personal computer card modem and the power using element is a radio transceiver.

17. A personal computer card operably connectable to a detachable battery pack, the personal computer card including a personal computer card socket allowing the connection of the personal computer card to a personal computer, the socket including a personal computer card socket power line, the personal computer card also including a power-using element operably connectable to the detachable battery pack and personal computer card socket; the personal computer card including a power controller adapted to select whether power is sent to the power-using element on the personal computer card from the personal computer card socket power line or from the detachable battery pack, the power controller adapted to detect the presence or absence of the detachable battery pack.

18. The personal computer card of claim 17, further comprising a power controller on the personal computer card powered from the personal computer card socket power line, the power controller adapted to send control signals to the detachable battery to selectively control the detachable battery to power the power using element.

19. The personal computer card of claim 17, wherein the power controller is an interface with a hand-held computer, wherein the interface is controlled by software running on the hand-held computer.

20. The personal computer card of claim 17, wherein the system can detect the presence or absence of the detachable battery.

21. The personal computer card of claim 17, wherein the system further comprises an external DC wall adapter that can be connected to the system to power the power-using element.

22. The personal computer card of claim 17, wherein the battery pack can be recharged from the personal computer card socket line.

23. The personal computer card of claim 17, wherein the personal computer card is a personal computer card modem and the power using element is a radio transceiver.

* * * * *